United States Patent [19]

Lee et al.

[11] Patent Number: 5,420,729
[45] Date of Patent: May 30, 1995

[54] HEAD CLEANER FOR VCR AND AUTOMATIC HEAD CLEANING APPARATUS AND METHOD

[75] Inventors: Byung H. Lee; Man S. Park, both of Suwon; Jong H. Kim, Pyungtak, all of Rep. of Korea

[73] Assignee: Gold Star Co., Ltd., Seoul, Rep. of Korea

[21] Appl. No.: 291,726

[22] Filed: Aug. 16, 1994

Related U.S. Application Data

[63] Continuation of Ser. No. 795,856, Nov. 22, 1991, abandoned.

[30] Foreign Application Priority Data

Nov. 22, 1990 [KR] Rep. of Korea ............... 18987/1990
Dec. 29, 1990 [KR] Rep. of Korea ............... 22439/1990
Dec. 29, 1990 [KR] Rep. of Korea ............... 22466/1990

[51] Int. Cl.⁶ ............................................. G11B 15/02
[52] U.S. Cl. ..................... 360/69; 360/128; 15/DIG. 12
[58] Field of Search ............... 360/64, 128, 99.02, 360/69; 15/DIG. 12

[56] References Cited

U.S. PATENT DOCUMENTS

| | | | |
|---|---|---|---|
| 3,702,906 | 11/1972 | Camras | 360/78.02 X |
| 3,731,289 | 5/1973 | Bajgert et al. | 360/128 |
| 3,964,104 | 6/1976 | Herron et al. | 360/128 |
| 4,120,007 | 10/1978 | Sato | 360/64 |
| 4,404,664 | 9/1983 | Ueki et al. | 360/72.1 X |
| 4,425,590 | 1/1984 | Johnstone et al. | 360/71 |
| 4,935,827 | 6/1990 | Oldershaw et al. | 360/77.16 |
| 5,119,249 | 6/1992 | Uchikoshi | 360/77.14 X |
| 5,136,317 | 8/1992 | Goto et al. | 354/21 |
| 5,170,304 | 12/1992 | Katohno et al. | 360/128 |
| 5,193,033 | 3/1993 | Shimoi et al. | 360/128 X |

FOREIGN PATENT DOCUMENTS 52-75426  6/1977 Japan ......................... 360/69

OTHER PUBLICATIONS

Ozawa et al. "New Portable Video Cassette Recorder" 8/79, IEEE Transactions on Consumer Electronics vol. CE-25 pp. 440-445.

A. Bruce Carlson "Communication Systems: An Introduction to Signals and Noise in Electrical Communication" 1968 pp. 194-195.

Thomas L. Harmon and Barbara Lawson "The Motorola MC68000 Microprocessor Family: Assembly Language, Interface Design and Systems Design" 1985 p. 1.

*Primary Examiner*—Aristotelis Psitos
*Assistant Examiner*—James T. Wilson
*Attorney, Agent, or Firm*—Finnegan, Henderson Farabow, Garrett & Dunner

[57] ABSTRACT

Automatic head cleaning apparatus and method for checking insensitivity of a VCR video head and for performing a head cleaning operation for a predetermined period. When the insensitivity of the video head is not corrected even after the head cleaning operation for the predetermined period, the VCR tape is ejected. Simultaneously, an alarm notifying a failure of the VCR is activated. A VCR head cleaner is also provided that is in close contact with a VCR drum head due to a magnetic reluctance force during the head cleaning operation. The VCR head cleaner prevents the video head from being subjected to adverse impact and frictional force, and is easily installed requiring no additional space within the VCR. Furthermore, the cleaning operation is automatically completed.

10 Claims, 10 Drawing Sheets

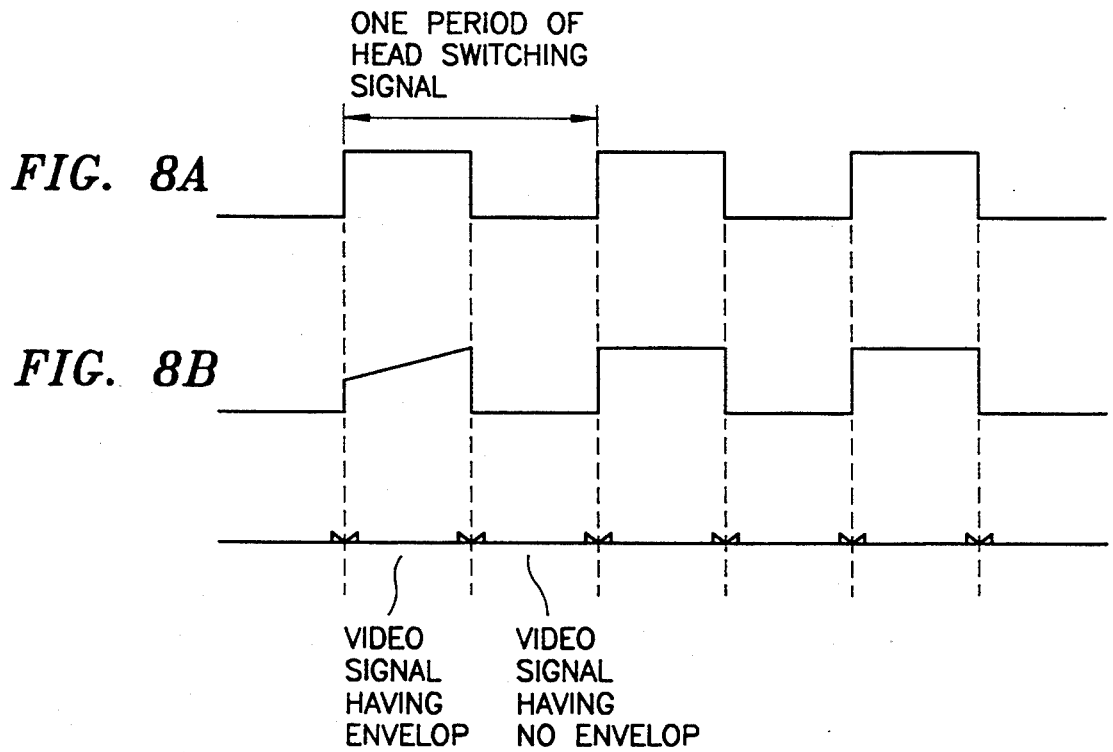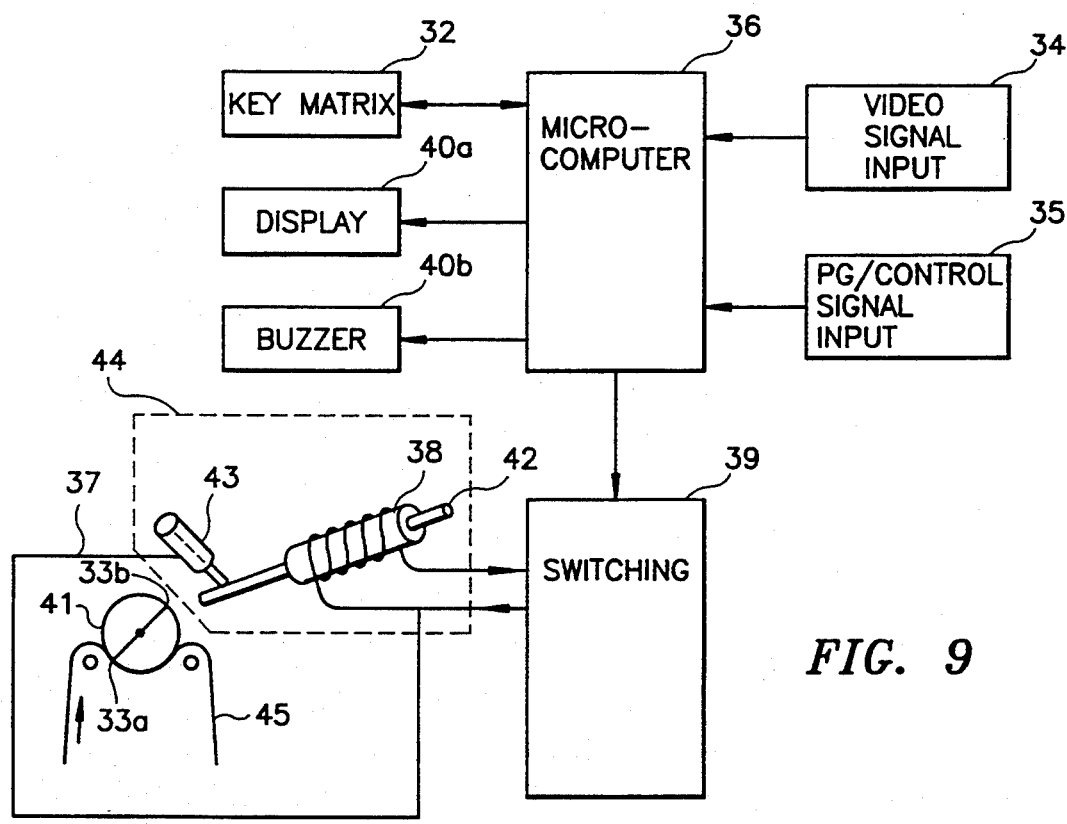

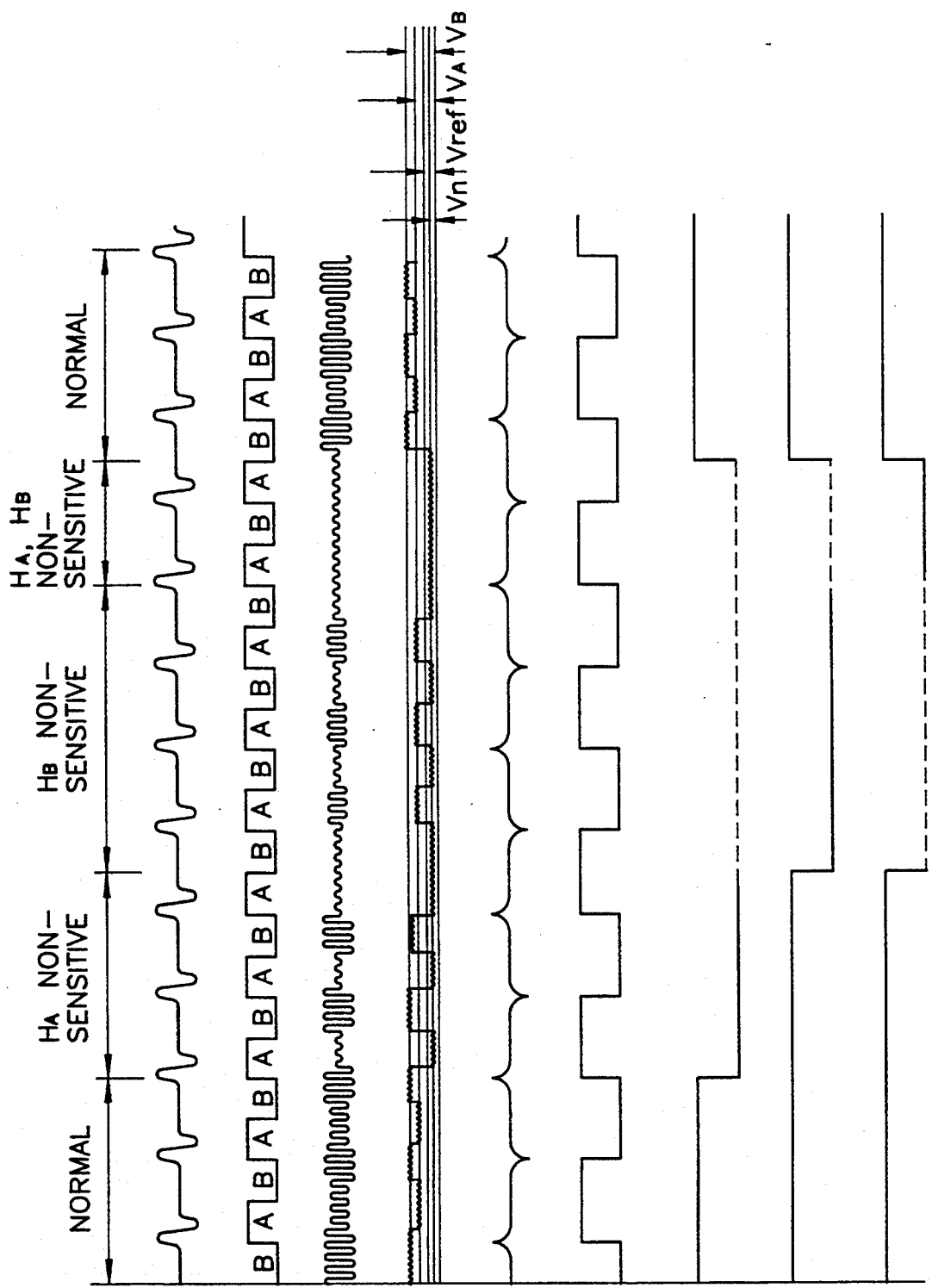

HEAD CLEANER FOR VCR AND AUTOMATIC HEAD CLEANING APPARATUS AND METHOD

This application is a continuation, of application Ser. No. 07/795,856 filed Nov. 22, 1991, now abandoned.

BACKGROUND OF THE INVENTION

1. Field of the Invention

The present invention relates to a video cassette tape recorder (hereinafter referred to as "VCR") and, more particularly, to a head cleaner for such a VCR and automatic head cleaning apparatus and method.

2. Description of the Prior Art

When foreign substances become attached to VCR heads, the ability of the heads to accurately scan video signals from cassette tapes is reduced. That is, the heads become relatively insensitive to tape. However, conventional VCRs have no provision for automatically removing such foreign substances upon the occurence of such insensitivity. Therefore, the user has to discover or at least recognize the insensitivity of VCR heads. After having discovered that the sensitivity of the head is no longer acceptable, the user must remove the cover from the VCR body and manually clean parts including the heads to remove foreign substances attached to the heads. Alternatively, a head cleaning tape may be used for removing the foreign substances.

It is difficult for VCR users without expert knowledge to discover with accuracy the insensitivity of the VCR heads by merely viewing the screen images produced by the VCR. Furthermore, the VCR may become damaged during the manual removal of foreign substances from the heads by the normal VCR user.

To avoid the above problem and inconvenience to the user of having to recognize the insensitivity of VCR heads and to clean the heads manually, or use a head cleaning tape, an apparatus has been provided for automatically recognizing the VCR head insensitivity and for automatically removing the foreign substances from the heads.

FIGS. 1A and 1B illustrate an example of a conventional head cleaning device that has been proposed to meet the above-mentioned requirement. As shown in these figures, a head cleaning device comprises an operating shaft 3 disposed to one side of a VCR drum head 1 supporting a head, and adapted to be reciprocated laterally by a solenoid 2. A connecting member 5 is pivotally connected at one end to the operating shaft 3 and mounted for pivotal motion on a fixed shaft 4 in response to reciprocating movement of the operating shaft 3. A support member 6 is pivotally connected to the other end of the connecting member 5 and adapted to support a cleaning member 7. Upon pivotal movement of the connecting member 5, the support member 6 is moved to bring the cleaning member 7 into contact with the rotating drum head 1 and clean the head.

When a foreign substance attached to the head is sensed by the user of the VCR during the playback operation, power is supplied to the solenoid 2 so that the operating shaft 3 moves in the direction indicated by an arrow "a" in FIG. 1B. As a result, the connecting member 5 pivots about the fixed shaft 4 in the direction indicated by an arrow "b" in FIG. 1B, thereby causing the cleaning member 7 attached to the support member 6 to be in close contact with the drum head 1. At this time, the drum head 1 is in a rotating state as by operating the VCR in the playback mode. Accordingly, the head can be cleaned through contact by the cleaning member 7.

However, the conventional head cleaning device shown in FIGS. 1A and 1B has the following problems.

First, the head cleaning device is inevitably mounted above the area for loading a cassette tape due to its manner of operation. As a result, the head cleaning operation cannot be carried out during the loading of the cassette tape. Furthermore, the head cleaning device occupies a large space to adversely affect the compactness of the VCR.

Second, the retraction force of the solenoid is directly transmitted through the operating shaft.

Third, when contacted by the cleaning member, the head may become worn and damaged due to the retraction force.

SUMMARY OF THE INVENTION

The present invention has been made in view of the above circumstances and has an object of overcoming the above-mentioned disadvantages encountered in the prior art and providing a VCR head cleaner capable of being in close contact with a VCR head by a magnetic repulsion force to prevent the head from being subjected to impact and frictional force.

Another object of the present invention is to provide a head cleaner that can be easily installed and require no additional space within the VCR.

Another object of the invention is to provide a head cleaning device and method capable of automatically cleaning the head by determining whether the head is insensitive and utilizing the head cleaner upon detecting the insensitivity of the VCR head.

In one aspect, the present invention provides a head cleaner for a VCR comprising: a cap fixedly mounted in the VCR and provided with an upper wall, a side wall, and a centrally opened bottom wall; an electromagnet attached to the inner surface of the upper wall of the cap to extend downwardly therefrom and adapted to induce a magnetic field upon receiving an electric power; a permanent magnet disposed to face the electromagnet in the cap to move from the induced magnetic field; a support shaft movably disposed in the cap and adapted to support the permanent magnet and shield the magnetic field of the permanent magnet, the support shaft having a protruded end extending through the opened bottom wall of the cap; resilient means operatively connected to the support shaft and adapted to urge the permanent magnet against the electromagnet; an arc shaped support member coupled to the protruded end of the support shaft and provided at its opposite ends with grooves, respectively; and a cleaning member separably engaged at its opposite ends with the grooves of the support member and adapted to be selectively in contact with and clean, a VCR head.

In another aspect, the present invention also provides an apparatus for cleaning a video head of a VCR comprising: amplifying means adapted to amplify a video signal played back by the video head of the VCR at a predetermined rate; integrating means adapted to integrate an output signal from the amplifying means; sample and hold means adapted to sample an output signal from the integrating means at every predetermined period and hold the sampled value until next period; comparing means adapted to compare output signals from the integrating means and the sample and hold means with each other; system control means adapted to determine whether the video head is at insensitive state, on the basis of an output signal from the comparing means and output a head cleaning signal upon determining the insensitive state of the video head; a head cleaner adapted to be selectively in contact with and clean, a drum head of the VCR, according to an external drive signal; and a drive means adapted to apply the drive signal to the head cleaner upon receiving the head cleaning signal from the system control means.

In a further aspect, the present invention provides an apparatus for automatically cleaning a video head of a VCR comprising: envelope detection means adapted to detect the envelope of a video signal played back by the video head of the VCR; envelope input means adapted to pass an output signal from the envelope detection means therethrough at every one period of a head switching signal; envelope calculation means adapted to sum envelopes received via the envelope input means at every one period of the head switching signal; data storing means adapted to store an output signal from the envelope calculation means at every one period of the head switching signal; envelope comparison means adapted to compare the envelope stored in the data storing means and corresponding to every one period of the head switching signal with a predetermined value; motor control means adapted to output a motor control signal for cleaning the video head according to the level of an output signal from the envelope comparison means; a loading motor, the rotation of which is controlled by the motor control means; and a head cleaner adapted to be selectively in contact with and clean, a drum head of the VCR by the loading motor.

In a further aspect, the present invention provides a method for automatically cleaning a video head of a VCR comprising the steps of: (a) accumulatively storing the envelope of a video signal received from a VCR tape loaded in the VCR via the video head at every one period of a head switching signal, during the playback operation of the VCR; (b) comparing the stored envelope corresponding to one period of the head switching signal with a predetermined reference value, and then if the envelope is more than the reference value, returning the process to its initial state, while if the envelope is no more than the reference value, counting up a first counter by one and then repeating the above steps; (c) if the counted value of the first counter is no more than a predetermined value, repeating the above steps, while if the counted value of the first counter is more than the predetermined value, performing a head cleaning operation by using a head cleaner and then counting up a second counter by one; (d) if the counted value of the second counter is no more than a predetermined value, repeating the above steps, while if the counted value of the second counter is more than the predetermined value, determining whether the video head is in a failure state where its insensitive state is not released even after the head cleaning operation and ejecting the VCR tape from the VCR to complete the process.

In a further aspect, the present invention also provides an apparatus for automatically cleaning a video head of a VCR comprising: video signal input means adapted to amplify a video signal received via the video head at a predetermined rate; phase generating (PG) and control signal input means adapted to receive a phase pulse and a control signal via a PG head and a control head, as a head switching signal and a VCR control signal, respectively; control means adapted to compare an output signal from the video signal input means with a predetermined reference signal at every one period of the head switching signal when a control signal from the PG and control signal input means is received for over a predetermined time, determine insensitive state of the video head according to the comparison result, and then output a corresponding control signal; a head cleaner adapted to be in contact with a drum head of the VCR upon receiving an electric power and perform a head cleaning operation; switching means adapted to switch the supply of electric power to the head cleaner under the control of the control means; display means adapted to display insensitive state of the video head and the release of the insensitive state under the control of the control means; and alarm means adapted to give an alarm to notify the failure of VCR when insensitive state of the video head is not released even after the head cleaning operation under the control of the microcomputer.

In a further aspect, the present invention also provides a method for automatically cleaning a video head of a VCR comprising the steps of: (a) discriminating whether recording of a VCR tape loaded in the VCR has been accomplished by determining whether a control signal has been generated from a VCR control head for over a predetermined time; (b) if the control signal has been generated from the VCR control head for over the predetermined time, sampling a video signal received via the video head at every one period of a head switching signal, predetermined times, accumulating the sampled values, and then calculating an average value of the sampled values; (c) if the average value is not less than a reference value, determining the video head not to be insensitive and returning the process to its initial state, while if the average value is less than the reference value, determining the video head to be insensitive and displaying the insensitive state of the video head; (d) if the video head has been determined to be insensitive, in step (c), performing a head cleaning operation, counting the head cleaning time, and repeating the above steps until the head cleaning time reaches a predetermined value; and (e) if the head cleaning time is not less than the predetermined value, displaying the continued insensitive state of the video head and then ejecting the VCR tape.

BRIEF DESCRIPTION OF THE DRAWINGS

Other objects and aspects of the invention will become apparent from the following description of embodiments with reference to the accompanying drawings in which:

FIGS. 1A and 1B are schematic views of a conventional head cleaning device, in which FIG. 1A shows a non-cleaning state and FIG. 1B shows a head cleaning state;

FIGS. 5A and 5B are schematic views for explaining head cleaning operation of the head cleaner, in which FIG. 5A shows a non-cleaning state and FIG. 5B shows a head cleaning state;

FIGS. 8A and 8B are respective diagrams of wave shapes generated in the units of FIG. 6;

FIG. 9 is a block diagram of an automatic head cleaning apparatus in accordance with a further embodiment of the present invention;

FIGS. 11A to 11I are respective diagrams of wave shapes generated in the units of FIG. 10.

DETAILED DESCRIPTION OF THE PREFERRED EMBODIMENTS

The present invention will now be described in detail in conjunction with FIGS. 2 to 12.

Figure 2A:
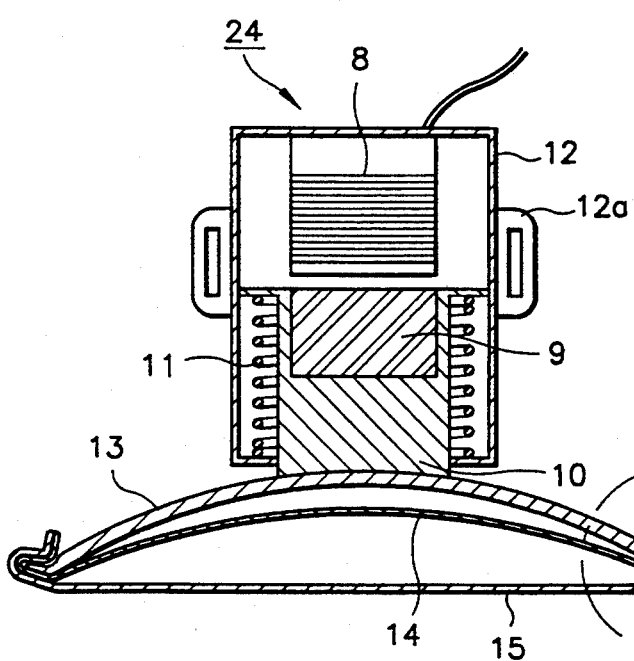
FIGS. 2A and 2B are a sectional view and a partially enlarged view, respectively, of the construction of a VCR head cleaner in accordance with the present invention.
Figure 2B:
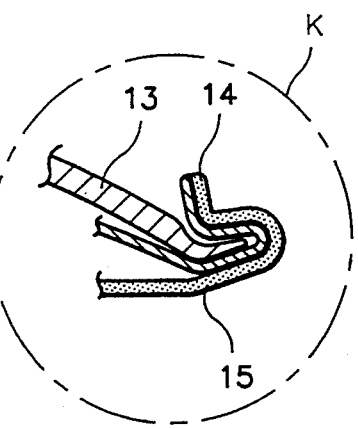

Referring to FIGS. 2A and 2B, a construction of a VCR head cleaner is shown in accordance with the present invention. As shown in the drawings, the head cleaner comprises an electromagnet 8 adapted to induce a magnetic field upon receiving a drive signal, a permanent magnet 9 disposed to face the electromagnet 8, and a support shaft 10 adapted to shield the magnetic field of the permanent magnet 9 which is embedded in the support shaft 10. Around the support shaft 10, a compression coil spring 11 is disposed to urge the permanent magnet 9 against the electromagnet 8. The electromagnet 8 is supported by an enclosure 12 of, for example, a cylindrical shape having an upper wall, a cylindrical side wall and a centrally opened bottom wall. That is, the electromagnet 8 is attached to the inner surface of the upper wall of the enclosure 12 to extend downwardly therefrom. The enclosure 12 functions to shield the magnetic field of the electromagnet 8. The compression coil spring 11 is also supported by the enclosure 12 such that it is interposed between the inner surface of the side wall of the enclosure 12 and the outer surface of the support shaft 10. Both ends of the compression coil spring 11 are supported at the bottom wall of the enclosure 12 and the outwardly extending upper flange portion of the support shaft 10. The enclosure is provided at the outer surface of its side wall with a pair of opposite mounting ears 12a adapted to fixedly mount the enclosure 12 to the outside, respectively. The lower end of the support shaft 10 extends downwardly through the opening formed at the bottom wall of the enclosure 12. An arc shaped support member 13 is fixedly mounted at its center portion to the protruded lower end of the support shaft 10. The support member 13 has at its opposite ends a pair of engaging grooves, respectively. To the support member 13, a cleaner support 14 is coupled, which has at its opposite ends a pair of curved ends engaging with the engaging grooves of the support member 13, respectively. To the cleaner support 14, a cleaner 15 is coupled, which has at its opposite ends a pair of curved ends fitted around the curved ends of the cleaner support 14.

Figure 3:
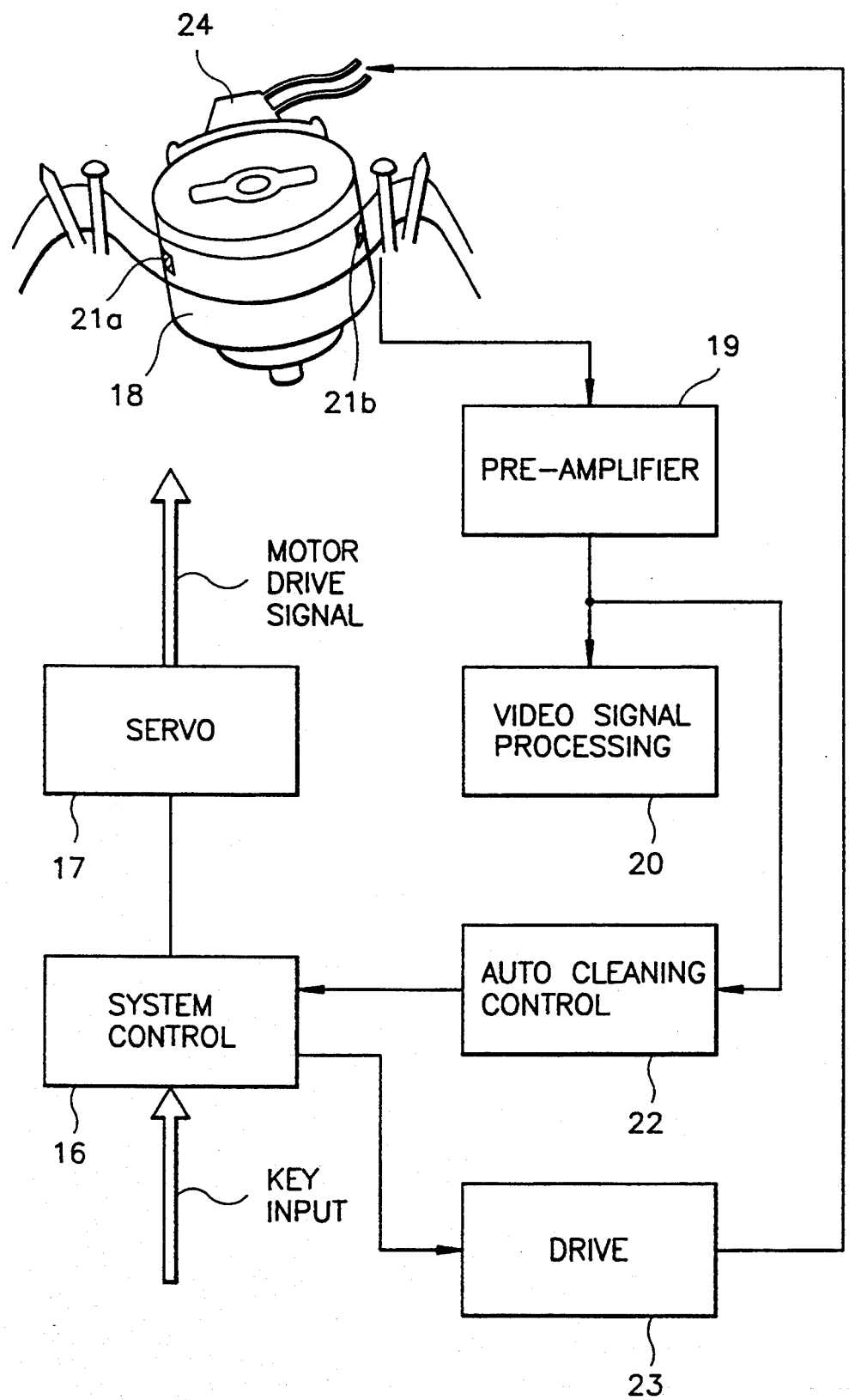
FIG. 3 is a block diagram of an automatic head cleaning apparatus for a VCR in accordance with an embodiment of the present invention.

Referring to FIG. 3, a block diagram of an automatic head cleaning apparatus for a VCR is shown in accordance with the first embodiment of the present invention.

As shown in FIG. 3, the head cleaning apparatus comprises a system control unit 16 adapted to send command signals to associated circuits according to key signals generated by the function selection of the user or receive signals from peripheral circuits and perform a predetermined control operation according to the received signals. In order to rotate a drum head 18 of the VCR at a constant rate and a constant phase, a servo motor 17 is provided, which controls a drum motor (not shown) of a conventional type to drive it at a constant rate and a constant phase, according to a signal from the system control unit 16. The head cleaning apparatus also comprises a pre-amplifier 19 adapted to read a video signal recorded on a VCR tape and pre-amplify it, a video signal processing unit 20 adapted to receive the amplified signal, separate a luminance signal and a color signal from the amplified signal and process them, an automatic cleaning control unit 22 adapted to receive the amplified signal from the pre-amplifier 19 to detect insensitivity of first and second VCR heads 21a and 21b mounted to the drum head 18 and send a corresponding detect signal to the system control unit 16, a drive unit 23 adapted to generate a drive signal for a head cleaning operation under the control of the system control unit 16, and a head cleaner 24 adapted to operate according to the supply of power provided by the drive signal from the drive unit 23.

Figure 1A:
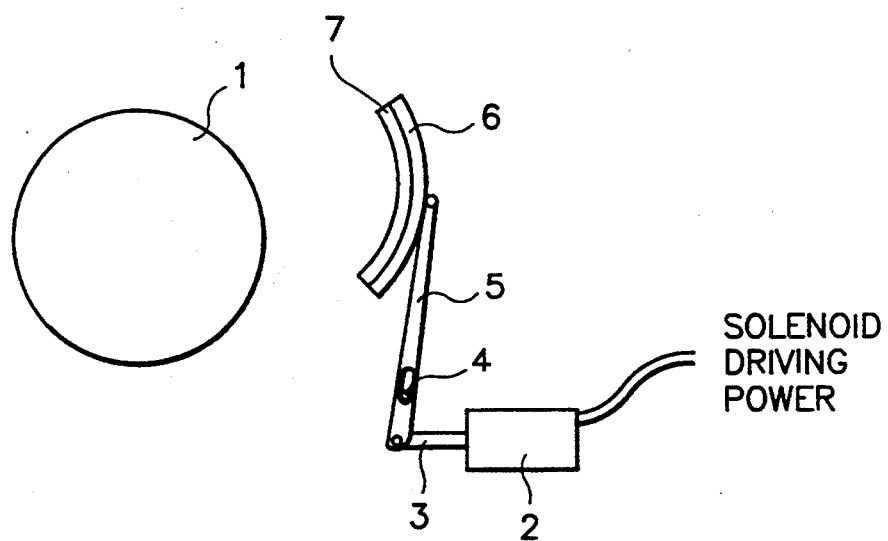
Figure 1B:
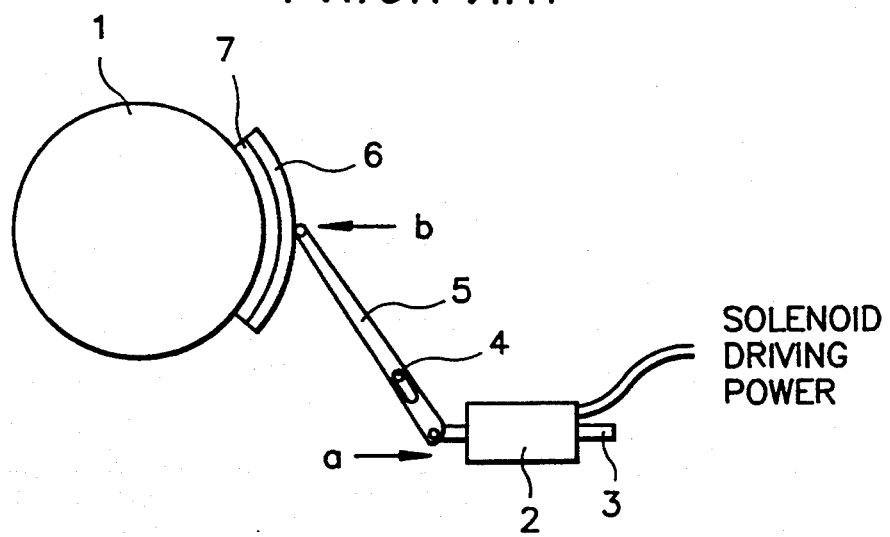
Figure 4:
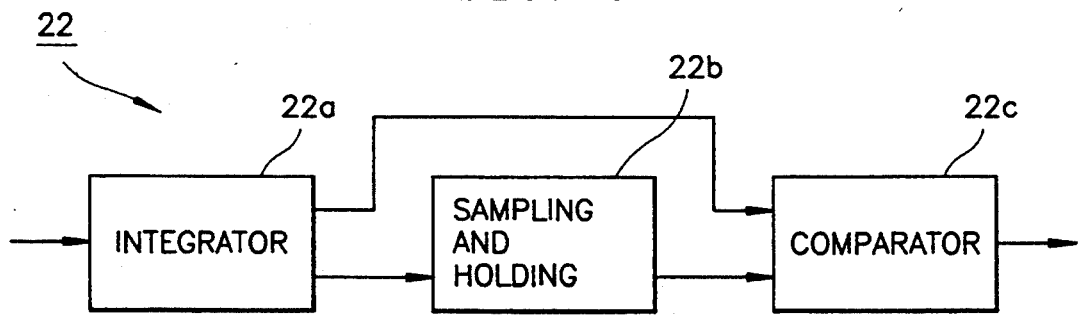
FIG. 4 is a block diagram of the automatic cleaning control unit shown in FIG. 3.

FIG. 4 is a block diagram of the automatic cleaning control unit 22 shown in FIG. 3. As shown in the drawing, the automatic cleaning control unit 22 comprises an integrator 22a adapted to integrate the amplified signal from the pre-amplifier 19, a sample and hold circuit 22b adapted to sample the integrated signal from the integrator 22a at every clock period corresponding to one period of head switching signal supplied from a PG (phase generating) head (not shown) of a conventional type and hold the sampled value until the next period, and a comparator 22c adapted to compare the sample and hold signal of a previous period with the current signal from the sample and hold circuit 22b and output the comparison value in the form of a signal corresponding to the insensitivity of VCR heads 21a and 21b to the system control unit 16. In this case, the PG head is mounted in the vicinity of the drum motor rotating the drum head 18 and adapted to generate a phase pulse signal indicative of the rotation state of first and second VCR heads 21a and 21b which rotate together by the rotation of the drum head 18. Generally, this phase signal from the PG head is utilized as the head switching signal for VCR heads 21a and 21b, in typical VCRs. From this head switching signal, it can therefore be determined which VCR head operates with respect to the play operation of VCR.

The operation of the head cleaner according to the first embodiment of the present invention will now be described.

Video signal played back by the drum head 18 of FIG. 3 is amplified by the pre-amplifier 19 and then treated in a well-known manner for treating color and luminance signals. The amplified signal in the pre-amplifier 19 is also applied to the automatic cleaning control unit 22. In the automatic cleaning control unit 22, the pre-amplified signal is integrated by the integrator 22a, then sampled at every clock period corresponding to one period of head switching signal supplied from the PG head, that is, the period of one time playback accomplished by first and second VCR heads 21a and 21b, and held until next period, by the sample and hold circuit 22b, as shown in FIG. 4. Thereafter, the output signal from the sample and hold circuit 22b is sent to one input of the comparator 22c. One of the output signals from the integrator 22a is sent to the other input of the comparator 22c so that it is compared with the sampled and held value of the previous period. The compared signal from the comparator 22c is applied to the system control unit 16 of FIG. 3. That is, the video signal of the previous period is compared with the current video signal in the comparator 22c which in turn outputs the compared signal for detecting the insensitivity of VCR heads 21a and 21b, to the system control unit 16.

Figure 5A:
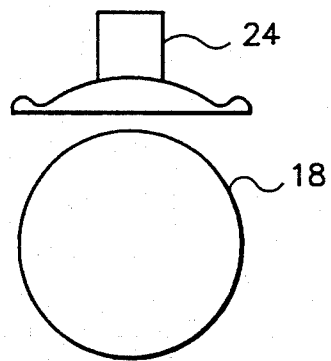
Figure 5B:
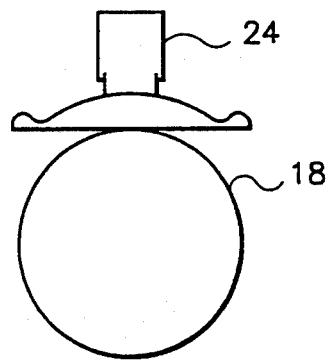

In the case in which the head cleaner 24 is activated, that is, the comparator 22c outputs a low signal, and the video signal of the previous period being higher than that of the current period, the system control unit 16 sends a drive signal to the drive unit 23 to supply electric power to the head cleaner 24. In this case, the head cleaner 24 which has been apart from the drum assembly 18 as shown in FIG. 5A moves to be in close contact therewith, as shown in FIG. 5B. This movement of the head cleaner 24 will now be described in detail, in conjunction with FIG. 2.

Since a magnetic field is induced in the electromagnet 8 by a current flowing through the electromagnet 8 by the drive unit 23, the permanent magnet 9 moves away from the electromagnet 8 against the resilience of the compression coil spring 11 due to magnetic reluctance. Simultaneously, the system control unit 16 sends a signal to the servo unit 17 so that the drum motor (not shown) is driven, thereby causing the drum head 18 to rotate. Thus, the VCR heads become attached and the rotating drum head 18 can be cleaned.

Upon completing the cleaning of the VCR heads in response to the insensitivity discriminating signal from the automatic cleaning control unit 22, the system control unit 16 stops outputting the drive signal to the drive unit 23. As a result, electric power ceases, so that the head cleaner 24 returns to its original position, as shown in FIG. 5A, due to the resilience of the compression coil spring 11. Thus, the overall cleaning operation of head cleaner 24 is completed.

In the above-mentioned first embodiment of the present invention, two VCR heads are equipped. However, the present invention can be applied to VCRs having more than two VCR heads.

As apparent from the above description, the head cleaning apparatus according to the first embodiment of the present invention eliminates the requirement of having the user clean the VCR heads frequently. Also, the head cleaner 24 is in close contact with the VCR heads 21a and 21b, due to the magnetic reluctance, so that the possibility of damaging or wearing the heads is considerably reduced over conventional mechanical devices. Also, the head cleaning apparatus can be installed easily without the requirement of an additional space within the VCR. Furthermore, the head cleaning apparatus provides a convenience, in that, the head cleaning operation is automatically completed.

Figure 6:
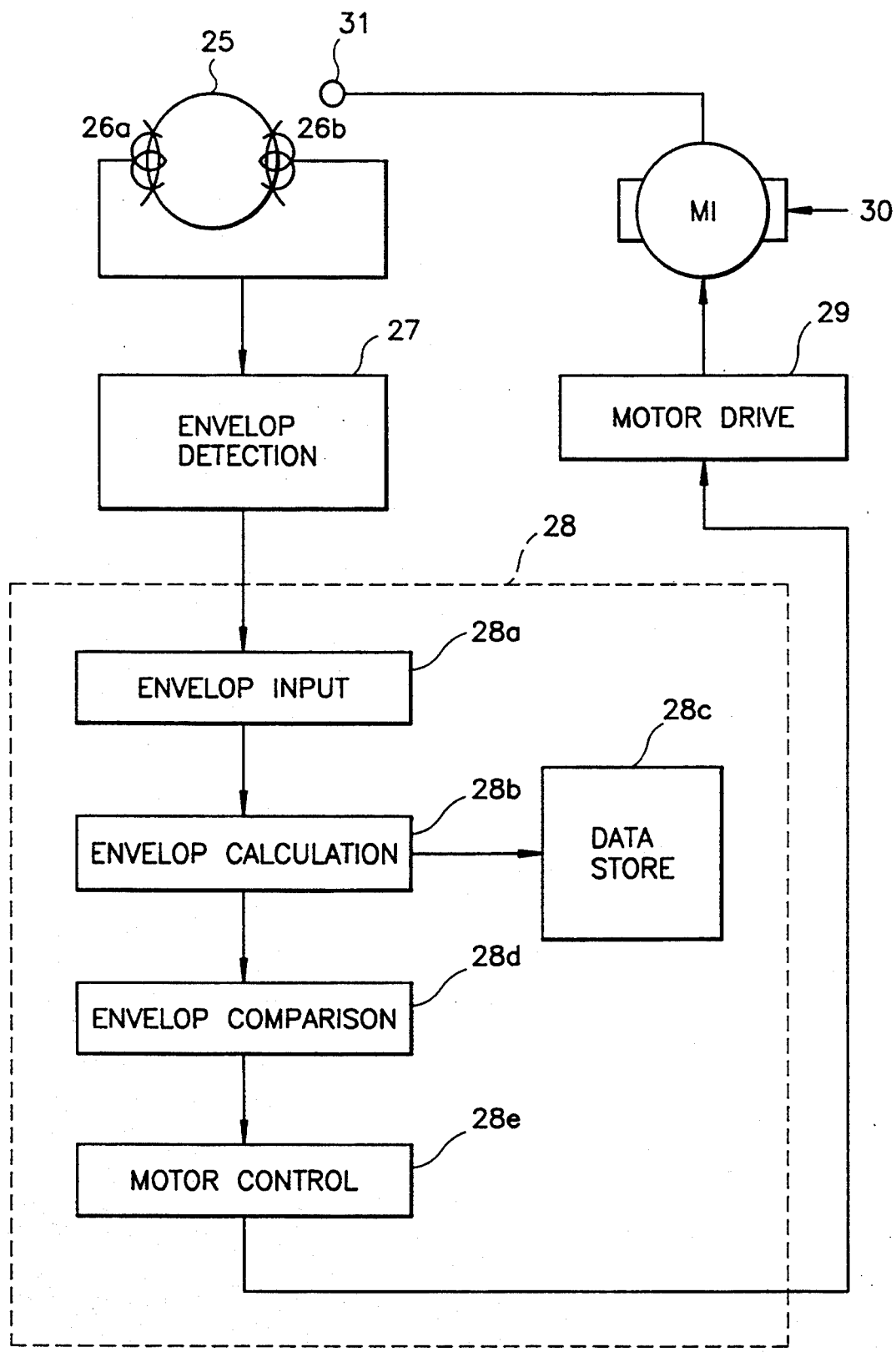
FIG. 6 shows an automatic head cleaning apparatus in accordance with another embodiment of the present invention.

Referring to FIG. 6, a head cleaning apparatus is shown in accordance with the second embodiment of the present invention.

As shown in the drawing, the head cleaning apparatus comprises an envelope detection unit 27 adapted to detect respective envelopes of video signals played back by a first channel video head 26a and a second channel video head 26b in rotating the drum head 25, a control device 28 adapted to inspect respective envelopes of video signals continuously received from the envelope detection unit 27 and output a control signal for cleaning the VCR head every time the envelope of the received video signal is recognized to be abnormal, a motor drive unit 29 adapted to output a motor drive signal upon receiving the control signal from the control device 28, a loading motor 30 rotating at a predetermined speed according to the motor drive signal from the motor drive unit 29, and a head cleaner 31 adapted to be in close contact with the first and second channel heads 26a and 26b to remove foreign substances from the heads during the rotation of the loading motor 30.

The control device 28 comprises an envelope input unit 28a adapted to receive the envelope of the video signal detected by the envelope detection unit 27 at every one-half period of a head switching signal, an envelope calculation unit 28b adapted to sum the envelopes received from the envelope input unit 28a for respective half periods corresponding to the first channel of the head switching signal and the envelopes received from the envelope input unit 28a for respective half periods corresponding to the second channel of the head switching signal at every one period of the head switching signal, respectively, a data storing unit 28c adapted to store output signals from the envelope calculation unit 28b therein, an envelope comparison unit 28d adapted to compare first and second channel envelopes corresponding to respective half periods of first and second channels of the head switching signal with a reference signal Vref, respectively, check insensitive state of video heads 26a and 26b on the basis of the comparison result, and then output a head cleaning control signal, and a motor control unit 28e adapted to output a motor control signal in response to the output of the head cleaning control signal from the envelope comparison unit 28d.

Similar to the first embodiment, the head switching signal is a phase pulse generated from the PG head. The PG pulse is typically a positive or negative pulse of 30 Hz detected by the head and magnet, disposed around a rotating rotor of the drum motor, during the rotation of video heads. The detection position of the signal has a mechanical relationship with the video heads. Accordingly, this signal is indicative of the positional relationship of the video heads. Furthermore, the signal is used for the phase control of the drum motor.

Figure 7:
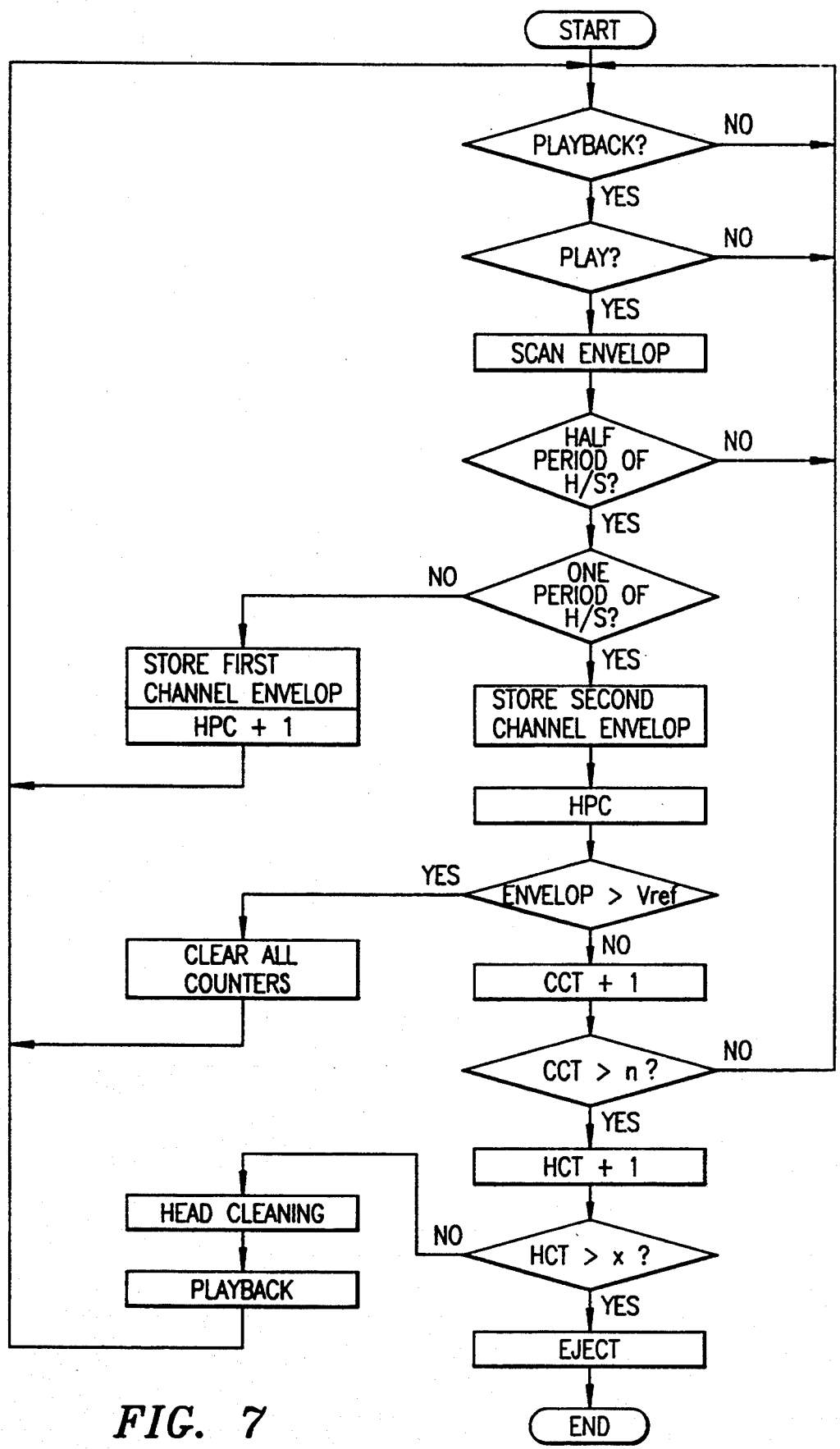
FIG. 7 is a flowchart of the operation of the automatic head cleaning apparatus shown in FIG. 6.

The operation of the head cleaner according to the second embodiment of the present invention will now be described in conjunction with the flowchart of FIG. 7 and wave diagrams of FIGS. 8A and 8B which show the head switching signal and the envelope, respectively.

When the user presses a playback key on a key matrix (not shown) of a conventional type, the control device 28 recognizes this manipulation and drives a deck system to rotate the drum motor (not shown). From the rotation of the drum motor, the drum head 25 rotates so that first and second channel video heads 26a and 26b play back video signals of first channel and second channel from the VCR tape, respectively, in synchronous with the head switching signal. At this time, the envelope detection unit 27 generates envelope waves corresponding to respective video signals played back by the first and second channel video heads 26a and 26b and sends them to the control device 28. The control device 28 stores accumulatively the first channel envelope from the envelope detection unit 27 for the first half period of the head switching signal and then increases the counted value of a head switching period counter HPC. Similarly, the control device 28 then stores accumulatively the second channel envelope from the envelope detection unit 27 for the second half period of the head switching signal and then ,increases the counted value of the head switching period counter HPC.

The moment the above operation is completed, that is, at the point of completing one period of the head switching signal, the control device 28 compares the first and second channel envelopes with a reference value Vref. The reference value Vref is predetermined by selecting one of the envelopes detected from normal video signals of the first channel or normal video signals of the second channel and then predetermining the level of the selected one to be lower than envelope levels of first and second channels by a predetermined rate, for example, 25%.

When respective envelope values of first and second channels are higher than the reference value, the control device 28 clears all counters and returns to its initial state. If the envelope values of first and second channels are not greater than the reference value, the control device 28 increases the counted value of the chattering counter CCT by one. For the next period of the head switching signal, the same operation is repeated. The operation is repeatedly continued until the counted value of the chattering counter CCT exceeds a predetermined number n. When the counted value of the chattering counter CCT exceeds a predetermined number n, the head cleaning operation is carried out by utilizing the head cleaner. After the head cleaning operation, the counted value of the head cleaning counter HCT is increased by one.

The process is repeated until the counted value of the head cleaning counter HCT exceeds the predetermined number x. In particular, when the counted value of the head cleaning counter HCT is not greater than the predetermined number x, the control device 28 performs an automatic tracking of a general function and then outputs a control signal for driving the motor 30 to the motor drive unit 29.

When electric power is applied to the loading motor 30 by the motor drive unit 29, the loading motor 30 rotates so that the head cleaner 31 moves to the first and second channel video heads 26a and 26b on the drum head 25. The head cleaner 31 is of a roller type so that by the rotation of the head cleaner 25, it rotates under the condition of being in close contact with the first and second channel video heads 26a and 26b, thereby cleaning the video heads.

When the value of the head cleaning counter HCT is determined to be more than the predetermined number x according to the repeated process, the control device 28 determines that one or both of the first and second channel video heads are still in a state where they are unable to normally play back video signals, namely, in the insensitive state, even after head cleaning operations of x times, and then clears all counters and simultaneously ejects the VCR tape to complete the playback thereof.

A high level interval of the wave shown in FIG. 8B corresponds to an envelope wave shape of a normal video signal, and a low level interval corresponds to a video signal without an envelope.

As apparent from the above description, the head cleaning apparatus according to the second embodiment of the present invention automatically checks for insensitivity of video heads and automatically performs a cleaning operation to remove foreign substances from the video heads when an insensitive state occurs. As a result, the head cleaning apparatus provides a convenience to the user and an advantage of stably operating the VCR.

Referring to FIG. 9, a block diagram of a head cleaning apparatus is shown in accordance with the third embodiment of the present invention.

As shown in the drawing, the apparatus comprises a key matrix 32 for setting a key signal for play, stop, fast forward or rewind functions according to the selection of the user, a video signal input unit 34 adapted to amplify video signals scanned by first and second channel video heads 33a and 33b to a predetermined level, a PG and control signal input unit 35 adapted to output a head switching signal in response to a signal scanned by the PG head and also to output a control signal scanned by the control head, a microcomputer 36 adapted to receive video signals of first and second channels scanned by first and second channel video heads 33a and 33b via the video signal input unit 34 during the playback operation and output a solenoid drive signal So when first and second channel video heads 33a and 33b are recognized to be insensitive, a switching unit 39 adapted to supply electric power to a solenoid 38 of a deck system 37 upon receiving the solenoid drive signal So from the microcomputer 36, a display 40a adapted to display various system states under the control of the microcomputer 36, and a buzzer 40b adapted to produce an alarm to notify a failure of the VCR when the insensitive state of the video heads is not released even after the head cleaning operation, under the control of the microcomputer.

In the third embodiment of the present invention, the deck system 37 is equipped with a head cleaner 44 which is additionally equipped with the solenoid 38 and a head cleaning roller 43. A shaft 42, which is coupled with the solenoid 38, is disposed at one side of the drum head 41 to move rectilinearly according to an ON or OFF state of the solenoid 38. To the inner end of the shaft 42, the cleaning roller 43 for cleaning the drum head 41 is rotatably mounted. The shaft 42 is supported at its middle portion by a tension coil spring (not shown) so that it is urged rearward due to the resilience of the spring. The parts corresponding to the head cleaner 44 may be substituted by those of FIG. 2.

Figure 10:
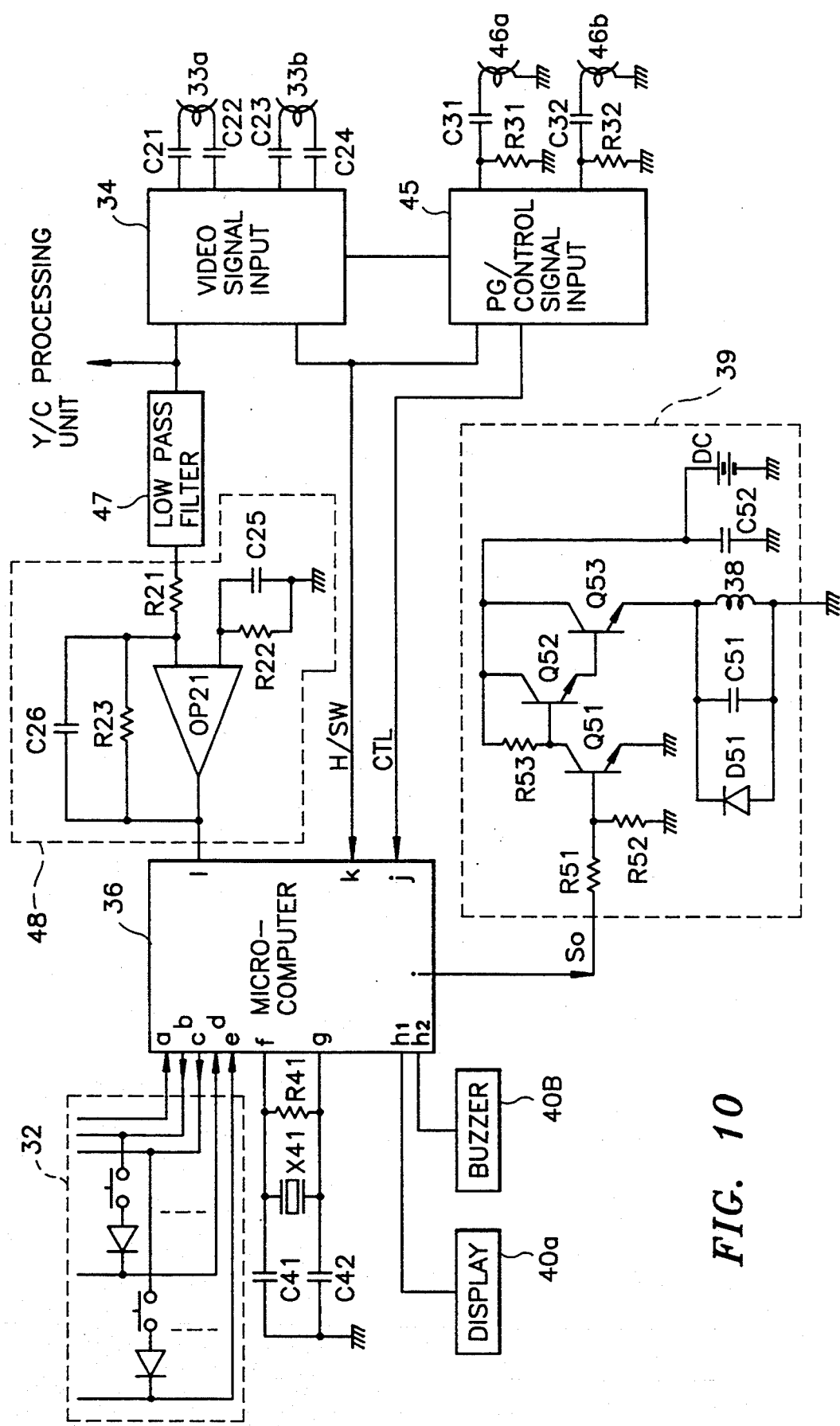
FIG. 10 is a circuit diagram of a control device shown in FIG. 9.
Figure 12A:
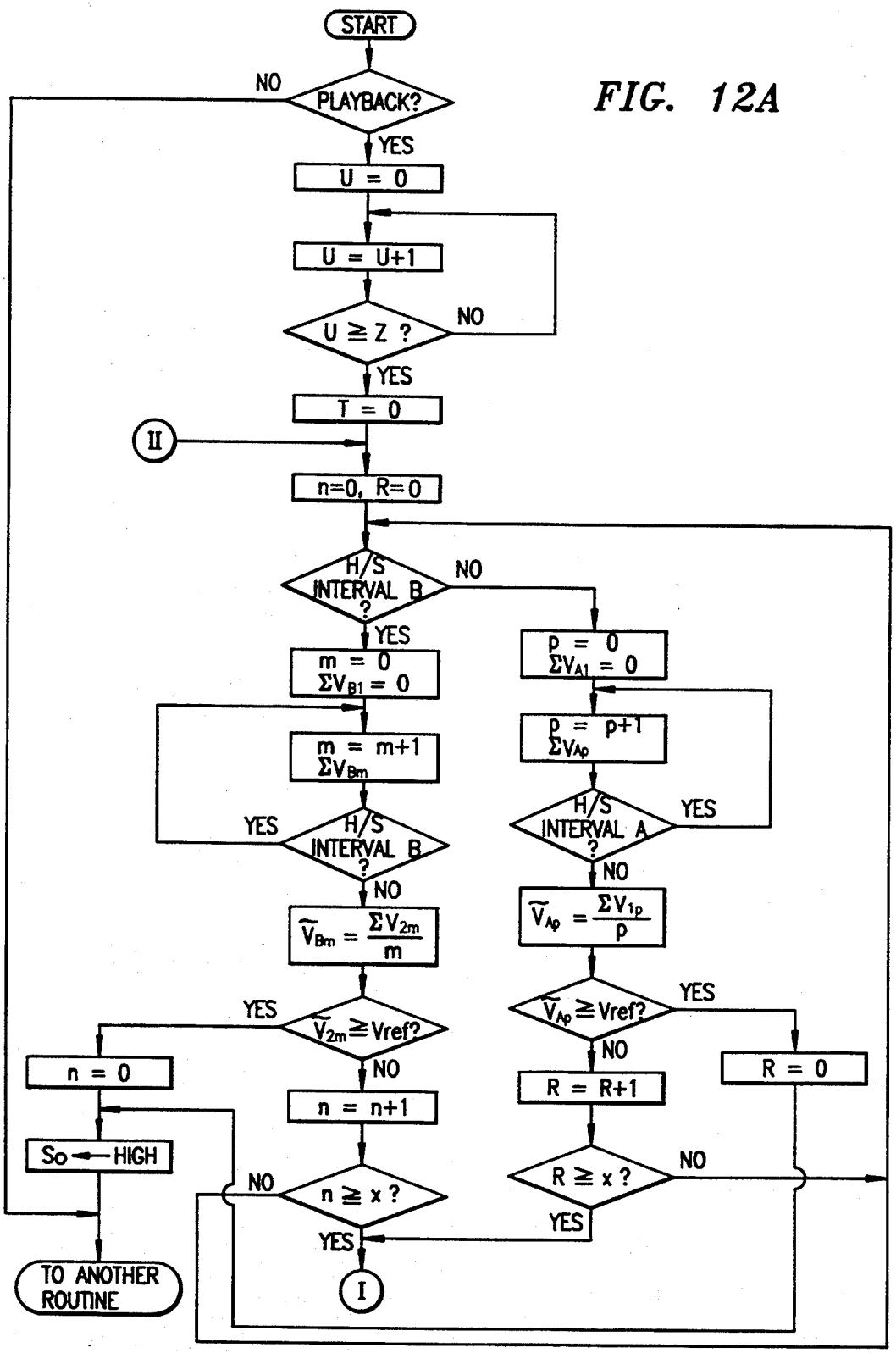
FIGS. 12A and 12B are flowcharts of the operation of the automatic head cleaning apparatus shown in FIG. 9.
Figure 12B:
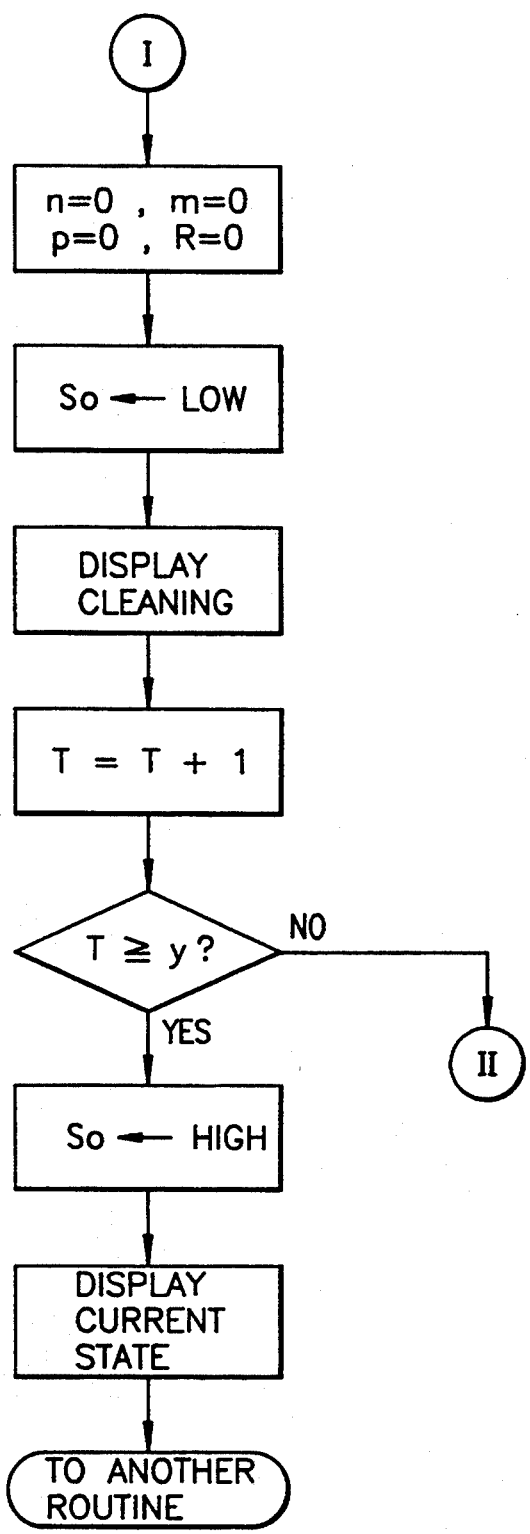

FIG. 10 is a circuit diagram of the control device shown in FIG. 9. FIGS. 11A to 11I are respective diagrams of wave shapes generated in the units of FIG. 10. FIGS. 12A and 12B are flowcharts of the cleaning apparatus in accordance with the third embodiment of the present invention. Now, the operation of the cleaning apparatus in accordance with the third embodiment of the present invention will be described in conjunction with FIGS. 9 to 12.

As the user manipulates the key matrix 32 to output a play signal therefrom, the microcomputer 36 scans the key matrix 32 and outputs a play control signal to the deck system 37. According to the control signal, the drum head 41 of the deck system 37 rotates so that the first channel video head 33a and the second channel video head 33b scan video signals of first and second channels recorded on a VCR tape, respectively.

Video signals of first and second channels are then amplified in the video signal input unit 34 to a predetermined level and produced to have a wave shape of FIG.

11C. The video signals are converted via a low pass filter 47 and an amplifier 48 to have a wave shape of FIG. 11A and then applied to an input port 1 of the microcomputer 36.

The PG head 46a detects a signal having a wave shape A of FIG. 8, during the rotation of the drum head 41. The control head 46b detects a control signal having a wave shape of FIG. 11E. According to the PG head signal and the control signal, the servo unit 45 generates a head switching signal H/S having a wave shape of FIG. 11B and a control signal having a wave shape of FIG. 11F and sends them to input ports k and j of the microcomputer 36, respectively.

Accordingly, the microcomputer 36 compares respective levels of the first and second channel video signals received from the amplifier 48 with a reference voltage. When the first channel video head 33a is determined to be insensitive, the microcomputer 36 outputs solenoid drive signal So having a wave shape of FIG. 11G to the switching unit 39. If the second channel video head 33b is determined to be insensitive, the microcomputer 36 performs automatic tracking, which is a conventional operation, and then outputs solenoid drive signal So having a wave shape of FIG. 11H to the switching unit 39. On the other hand, when both video heads 33a and 33b are determined to be insensitive, the microcomputer 36 outputs solenoid drive signal So having a wave shape of FIG. 11I to the switching unit 39.

In any one of the above solenoid drive signals So, the transistor Q51 is disabled at the low level interval of the solenoid drive signal So. On the other hand, the transistors Q52 and Q53, which are Darlington-connected with each other, are enabled so that the shaft 42 moves toward the drum head 41, thereby causing the cleaning roller 43 mounted to the end of the shaft 42 to be in close contact with the drum head 41. As a result, the cleaning roller 43 rotates by the rotating force of the drum head 41 so that the first and second channel video heads 33a and 33b are in close contact with the rotating, cleaning roller 43 to remove foreign substances therefrom.

As the microcomputer 36 outputs a high level signal to the switching unit 39, transistors Q51 and Q52 become enabled and disabled, respectively, thereby causing the solenoid 38 to become disabled. Therefore, the shaft 42 returns to its original position by the resilience of the tension coil spring to complete the head cleaning operation.

The control operation of the microcomputer 36 will now be described in conjunction with FIGS. 12A and 12B.

First, the microcomputer 36 determines whether the VCR is in a playback operation. If the VCR is not in the playback operation, the procedure proceeds to a next processing routine. When the VCR is in the playback operation, a counter which counts control pulses CTL is initialized (U=0). Thereafter, the microcomputer 36 receives a control pulse CTL and checks whether the counted value of the control pulse counter U is more than a predetermined time Z in order to determine whether any video signal has been recorded on a VCR tape currently loaded in the deck system 37, that is, whether any control pulse has been recorded thereon. If the counted value of the counter U is more than the predetermined time Z, a counter T for counting the drive time of the solenoid 38 is initialized. Simultaneously, the microcomputer 36 also initializes a counter n which functions to determine how many periods the second channel video head 33b has been in under the insensitive state. Thereafter, a counter R for the first channel video head 33a is initialized.

The microcomputer 36 then checks whether head switching pulse H/S received from the PG and control signal input unit 35 is low, that is, whether the second channel video head 33b has been selected. In the interval corresponding to the second channel video head 33b, a counter m, which counts a sampling number, is initialized. Thereafter, the value of first sampled output voltage $V_2$ of the second channel video head 33b is initialized ($\Sigma V_{21}=2$).

As the sampling proceeds, the sampling number is accumulated (m=m+1). Simultaneously, each value of output voltage $V_2$ of the second channel video head 33b is also accumulated ($V_{2m} = \Sigma V_{2m}$). The process is repeated in intervals corresponding to the second channel video head 33b. The moment the interval of head switching pulse H/S corresponds to the first channel video head 33a, the microcomputer 36 divides the sum $\Sigma V_{2m}$ of output voltages of the second channel video head 33b by the sampling number m to calculate the average output voltage $\overline{V}_{2m}$.

The calculated average output voltage $\overline{V}_{2m}$ of the second channel video head 33 is then compared with a predetermined reference voltage Vref. If the average output voltage $\overline{V}_{2m}$ is not less than the reference voltage Vref, the microcomputer 36 determines that the second channel video head 33b is sensitive and initializes the counter n. After the solenoid 38 becomes inactive, the procedure proceeds to another routine for performing other operations.

However, when the average output voltage $\overline{V}_{2m}$ is less than the reference voltage Vref, the microcomputer 36 increments the value of the counter n until it is identical to the predetermined value x. Every time the second channel video head 33b is determined to be insensitive during the repeated process, a control operation for treating the insensitivity of the head 33b is carried out.

On the other hand, when the head switching signal H/S is determined to be high, a determination for the insensitivity of the first channel video head 33a is performed on the basis of the output voltage value $V_{1p}$ of the second channel video head 33b, as in the case of the second channel video head 33b.

If both the first channel video head 33a and the second channel video head 33b are determined to be insensitive, all counters n, m, p and R are initialized. In order to perform the head cleaning operation, the microcomputer 36 also outputs solenoid drive signal So of low level to the switching unit 39 and displays the current insensitive state through the display unit 40a. Thereafter, the microcomputer 36 increments the value of the counter T to count the drive time of the solenoid 38 so that it can determine whether the incremented value of the counter T is less than a predetermined value y. If the incremented value of the counter T is not less than the predetermined value y, the procedure returns to the step for determining the head switching interval so that the insensitivity of both the first channel video head 33a and the second channel video head 33b is continuously checked.

When the counted value of the counter T is more than the predetermined value y, the microcomputer 36 determines the current state to be a state in which the insensitive state cannot be released even after the head cleaning operation, that is, another failure state, and then stops the output of solenoid drive signal So. Thereafter, the microcomputer 36 displays the continued insensitivity of video heads on the display 40a and activates an alarm notifying the failure of the VCR through the buzzer 40b. Upon completing these operations, the procedure proceeds to the next routine.

As apparent from the above description, the head cleaning apparatus according to the third embodiment of the present invention automatically checks the insensitivity of the video heads, and displays the insensitive state, and automatically performs a cleaning operation to remove foreign substances from the video heads when such insensitivity occurs. As a result, the present invention provides a convenience to the user and an advantage of stably operating the VCR.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method for automatically cleaning a video head of a video cassette recorder (VCR) having a VCR tape and a head cleaner, comprising the steps of:
   (a) accumulatively storing an envelope of a video signal received from the VCR tape loaded in the VCR through the video head at every one period of a head switching signal during a playback operation of the VCR;
   (b) comparing the stored envelope corresponding to said one period of the head switching signal with a predetermined signal;
   (c) returning all counters to an initial state when the envelope is greater than the predetermined signal;
   (d) incrementing a first counter and repeating the steps (a) through (c) until the value of the first counter is greater than a first predetermined value, and performing a head cleaning operation by using the head cleaner when the value of the first counter is greater than said first predetermined value and incrementing a second counter;
   (e) repeating the steps (a) through (d) until the value of the second counter is greater than a second predetermined value; and
   (f) indicating that said value of the second counter is greater than said second predetermined value.

2. The automatic head cleaning method according to claim 1, wherein the reference value in the step (b) is predetermined by accumulating the envelope of a normally received video signal for one period of a head switching signal and then dividing the accumulated envelope by a third predetermined value.

3. The automatic head cleaning method according to claim 1, further comprising a step of performing an automatic tracking operation before the head cleaning operation when the value of the second counter is less than the first predetermined value in the step (c).

4. The automatic head cleaning method according to claim 1 further comprising a step of performing an automatic tracking operation before the head cleaning operation when the value of the first counter is equal to the first predetermined value in the step (c).

5. The apparatus for automatically cleaning a video head of a video cassette recorder according to claim 1, further including the step of performing an auto-tracking operation before performing the head cleaning operation.

6. The method according to claim 1, wherein the indicating step includes the step of ejecting the VCR tape from the VCR.

7. A method for automatically cleaning a video head of a VCR having a VCR tape and a VCR control head, comprising the steps of:
   (a) determining whether a recording of the VCR tape loaded in the VCR has been accomplished by determining whether a control signal has been generated from the VCR control head for over a predetermined time;
   (b) sampling a video signal received through the video head every one period of a head switching signal, accumulating the sampled values, and then calculating an average value of the sampled values when the control signal has been generated from the VCR control head for over the predetermined time;
   (c) comparing the average value to a reference value and returning all counting times to an initial state until the average value is less than the reference value, and determining whether the video head is insensitive and displaying an insensitivity of the video head when the average value is less than the reference value;
   (d) performing a head cleaning operation, counting a head cleaning time, and repeating the above steps until the head cleaning time reaches a predetermined value when the video head has been determined to be insensitive in the step (c),
   (e) continuously displaying the insensitivity of the video head, when the head cleaning time is greater than or equal to the predetermined value.

8. The automatic head cleaning method according to claim 7 further comprising a step of performing an automatic tracking operation after the step (c).

9. The automatic head cleaning method according to claim 7, further comprising a step of activating an alarm notifying a failure of the VCR after the step (e).

10. The method according to claim 7, further including the step of ejecting the VCR tape when the head cleaning time is greater than or equal to the predetermined value.

* * * * *